United States Patent [19]
Hauck et al.

[11] 4,330,721
[45] May 18, 1982

[54] APPARATUS FOR GENERATING TEMPORALLY SHAPED, LASER PULSES

[75] Inventors: James P. Hauck, Tustin; Cecil L. Hayes, Placentia; James D. McMullen, Orange, all of Calif.

[73] Assignee: Rockwell International Corporation, El Segundo, Calif.

[21] Appl. No.: 152,914

[22] Filed: May 23, 1980

[51] Int. Cl.³ .............................................. H03F 7/00
[52] U.S. Cl. .................................................. 307/425
[58] Field of Search ........................ 307/425, 426, 427

[56] References Cited

U.S. PATENT DOCUMENTS

4,200,808  4/1980  Herbst ................................. 307/425

Primary Examiner—David C. Nelms
Assistant Examiner—Darwin R. Hostetter
Attorney, Agent, or Firm—H. Fredrick Hamann; James F. Kirk

[57] ABSTRACT

Apparatus for generating a high-energy temporally shaped, coherent series of laser pulses having signal components on pre-selected rotational vibrational transitions, comprising: a waveguide laser array having an output comprising a desired temporally shaped coherent series of laser pulses on one pre-selected rotational vibrational transition, a second-harmonic generator arranged to double the waveguide laser array output frequency, a line matching laser array having a plurality of outputs of another temporal shape on additional rotational vibrational transitions, and means comprising an array of difference frequency mixers responsive to synchronized reception of line matching laser array outputs and said frequency doubled waveguide laser array output to form a corresponding high-energy, coherent series of laser pulses having a waveguide laser array output-determined temporal shape and line matching laser array output-determined rotational vibrational transitions.

26 Claims, 4 Drawing Figures 4,330,721

APPARATUS FOR GENERATING TEMPORALLY SHAPED, LASER PULSES

BACKGROUND OF THE INVENTION

1. Field of the Invention

This invention relates to the field of high-energy laser amplifiers, and more particularly to pulse forming apparatus highly useful for laser radar, optical communication systems, and isotope separation purposes.

In these mentioned applications, laser pulses are required having appropriate temporal and spatial profiles. The pulse shaping technique to obtain these profiles must be widely variable and permit control of the output pulse shape over a large dynamic range.

The pulse forming apparatus of the present invention is highly advantageous in that the pulse shape is established at a very early stage, and this shape may be modified to compensate for distortion introduced by subsequent laser amplifiers. The present invention apparatus is further advantageous in that laser pulse shapes can be synthesized by methods consistent with the principles of Fourier analysis, so that once the temporal profile of the desired pulse is known, the individual spectral components can be determined from a Fourier analysis and the machine can then be adjusted to produce the required spectra. Importantly, these advantages of the invention apparatus are realized with a substantial reduction in the number of laser oscillators required to produce a pulse of given shape without loss of dynamic range and bandwidth.

2. Description of the Prior Art

High-energy $CO_2$ laser amplifiers operate on vibrational bands having known center wavelengths commonly referred to as P(18), P(14), P(16), and so on. A vibrational band of great interest is the one having a center wavelength at about 10.6 $\mu m$, (P(18)). High power can be obtained from a high-energy $CO_2$ laser amplifier operating on this particular vibrational band. The rotational vibrational transition having a center wavelength at 10.6 $\mu m$ is also referred to as the 00.1 to 10.0 transition. Within a vibrational band, $CO_2$ lasers can be tuned to operate on discrete rotational vibrational transitions or branches, e.g., P(14), P(16), P(18), P(20), and P(22).

The use of high-energy laser amplifiers may require a laser pulse source which produces predetermined pulse shapes over time, i.e., temporally shaped, replicative, i.e., coherent laser pulses having signal components on pre-selected rotational vibrational transitions with which to excite the high-energy laser amplifier. The power level of this laser amplifier pulse source is high, and that of the high-energy laser amplifier may be several orders of magnitude greater than that of the laser pulse source.

In the prior art, there is a fundamental problem in producing coherent pulses with an appropriate temporal profile. The problem is that distortion is introduced between the point of formation of the pulse and the target at which the pulse is used. To overcome the distortion, the laser pulse apparatus must provide a suitable level of flexibility in its operation, so that the output pulses can be temporally shaped over a suitable dynamic range to compensate for distortion. Some applications require pulse shapes having a very wide dynamic range, previously achievable only with large numbers of lasers. For example, to obtain a pulse having a dynamic range of 70 dB, the outputs of as many as 72 lasers heretofore would have had to be combined.

The need to use a large number of separate lasers to produce pulses having a large dynamic range is obviated by the present invention.

SUMMARY OF THE INVENTION

It is therefore a major objective of this invention to provide a pulse forming apparatus producing a series of temporally shaped coherent laser pulses having signal components on pre-selected rotational vibrational transitions and with a dramatic reduction in the number of lasers required.

It is a further object of the invention taught herein to provide such apparatus in which the temporal shape of the pulse generated is easily modified to compensate for distortion and have a dynamic range in excess of 70 decibel (dB) in power.

Another object of the invention is to provide such apparatus in which the number of lasers required to produce the required pulse power gain is minimized.

It is a particular object of this invention to produce a periodically stable series of laser pulses of very short duration, i.e., having a duration of less than 10 nanoseconds, (ns).

It is yet another object of this invention to produce a series of laser pulses having a very short rise time in output power P, i.e., having the output power P change with a rate, dP/dt in excess of 60 dB/ns.

These and other objectives of the invention are realized in accordance with the invention in an apparatus for generating a high-energy temporally shaped, coherent series of laser pulses having signal components on pre-selected rotational vibrational transitions comprising a waveguide laser array having an output comprising a desired temporally shaped coherent series of laser pulses on one preselected rotational vibrational transition, a second-harmonic generator arranged to double the waveguide laser array output frequency, a line matching laser array having a plurality of outputs of another temporal shape on addtional rotational vibrational transitions, and means comprising an array of difference frequency mixers responsive to synchronized reception of line matching laser array outputs and the frequency doubled waveguide laser array output to form a corresponding high-energy, coherent series of laser pulses having a waveguide laser array output-determined temporal shape and line matching laser array output-determined rotational vibrational transitions.

In a more particular embodiment, the invention provides apparatus for generating a high-energy temporally shaped, coherent series of laser pulses having signal components on pre-selected rotational vibrational transitions, the apparatus having few lasers relative to the dynamic range realized comprising a second-harmonic generator, a waveguide laser array having a desired temporally shaped pulse output to the second-harmonic generator, a line matching laser array of lasers operation on separate pre-selected rotational vibrational transitions, a detector synchronizer responsive to the pulse output of the waveguide laser array in line matching laser synchronous pulse generating relation, a corresponding series of difference frequency mixers receiving the output of the second-harmonic generator and respectively the outputs of the line matching lasers to form a high-energy, coherent series of laser pulses having a waveguide laser array output-determined temporal shape and line matching laser array output-determined rotational vibrational transitions.

In each of the foregoing, and other embodiments of the invention, the second-harmonic generator typically comprises stacked crystal plates, e.g., of GaAs, having transparency, thickness, separation and angle of incidence characteristics providing doubling of the frequency of the output of the waveguide laser array; the difference frequency mixers typically comprise stacked crystal plates, e.g., also comprising GaAs, and having transparency, thickness, separation and angle of incidence characteristics mixing the synchronously received outputs responsive to sensed frequency differences therebetween; preferably each of the lasers is a $CO_2$ laser; the apparatus further typically includes means to vary the power separately to each laser of the waveguide laser array and means to vary the power separately to each laser of the line matching laser array; one line matching laser operates on a rotational vibrational transition corresponding to the rotational vibrational transition of the waveguide laser array and other line matching lasers operate at relatively spaced wavelengths; a laser amplifier typically is provided amplifying the output of the second-harmonic generator to the difference frequency mixers; a laser amplifier amplifying the waveguide laser array output to the second-harmonic generator may also be provided as may a laser amplifier amplifying the line matching laser output to the difference frequency mixers.

DESCRIPTION OF THE PREFERRED EMBODIMENT

Figure 1:
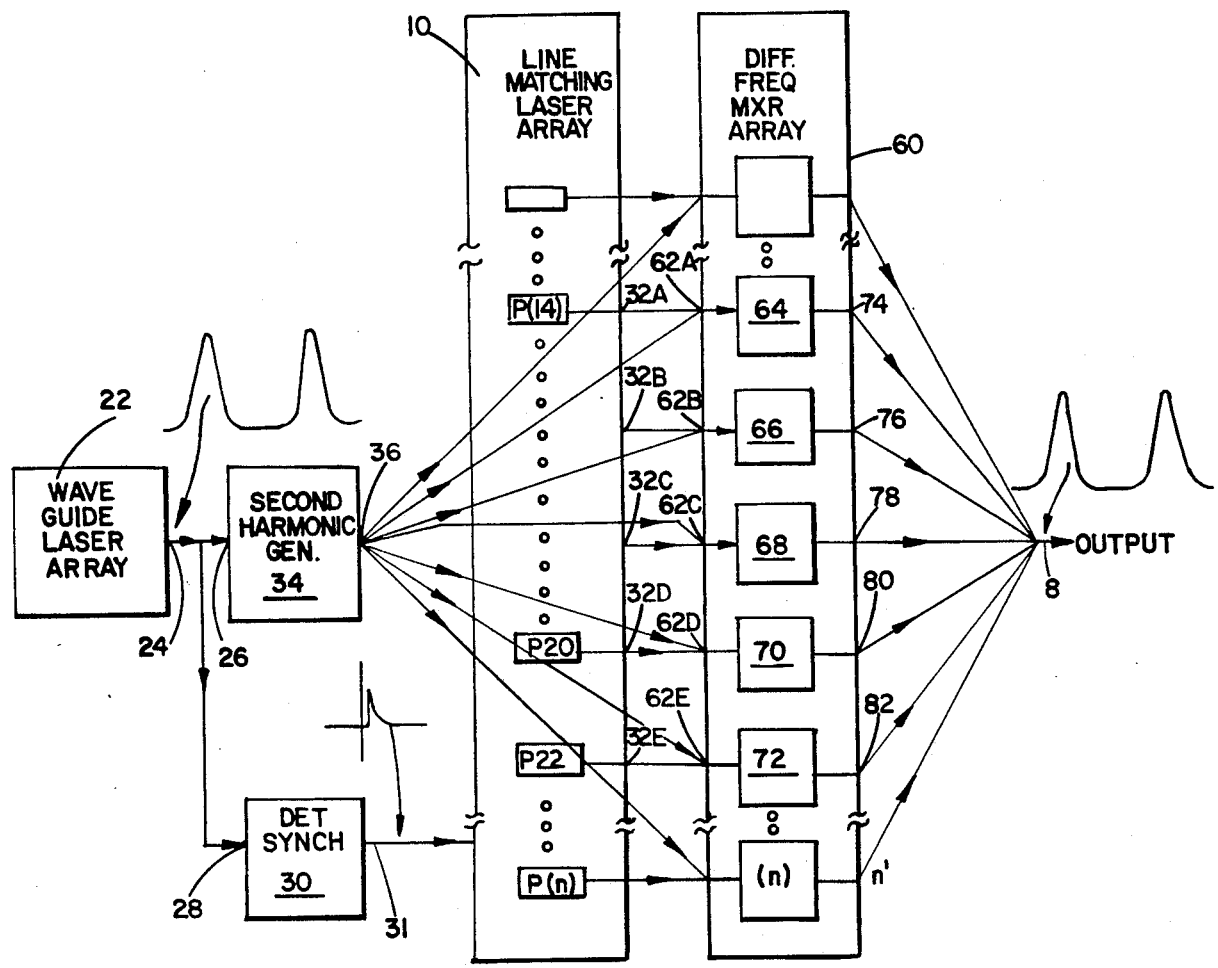
FIG. 1 is a schematic illustrative of a laser pulse apparatus.

In accordance with the present invention, FIG. 1 is a schematic illustration of an apparatus for generating a high-energy temporally shaped, coherent series of laser pulses having signal components on pre-selected rotational vibrational transitions. This illustration is shown having a waveguide laser array 22 having an output comprising a desired temporally shaped coherent series of laser pulses on one pre-selected rotational vibrational transition, optically coupled to the input 26 of a second-harmonic generator 34 arranged to double the waveguide laser array output frequency. A line matching laser array 10 is shown having a plurality of outputs 32A-32E of another temporal shape on additional rotational vibrational transitions optically coupled to the inputs 62A-62E an array of difference frequency mixers 60. The output 36 of the second-harmonic generator 34 is shown optically coupled to the inputs 62A-62E of the difference frequency mixer array 60. The difference frequency mixers 64-72 are responsive to synchronized reception of the line matching laser array outputs 32A-32E and the frequency doubled waveguide laser array output 36 to form at output 8 a corresponding high-energy, coherent series of laser pulses having a waveguide laser array output-determined temporal shape and line matching laser array output-determined rotational vibrational transitions. The output 24 of the waveguide laser array 22 is also shown optically coupled to the input 28 of the detector synchronizer 30. The output 31 of the detector synchronizer 30 is shown electrically connected to the synchronizing inputs 12-20 of the line matching laser array 10. Outputs 74-82 of the difference frequency mixer array 60 are shown to be optically combined to form the output 8 of the present invention.

Figure 2:
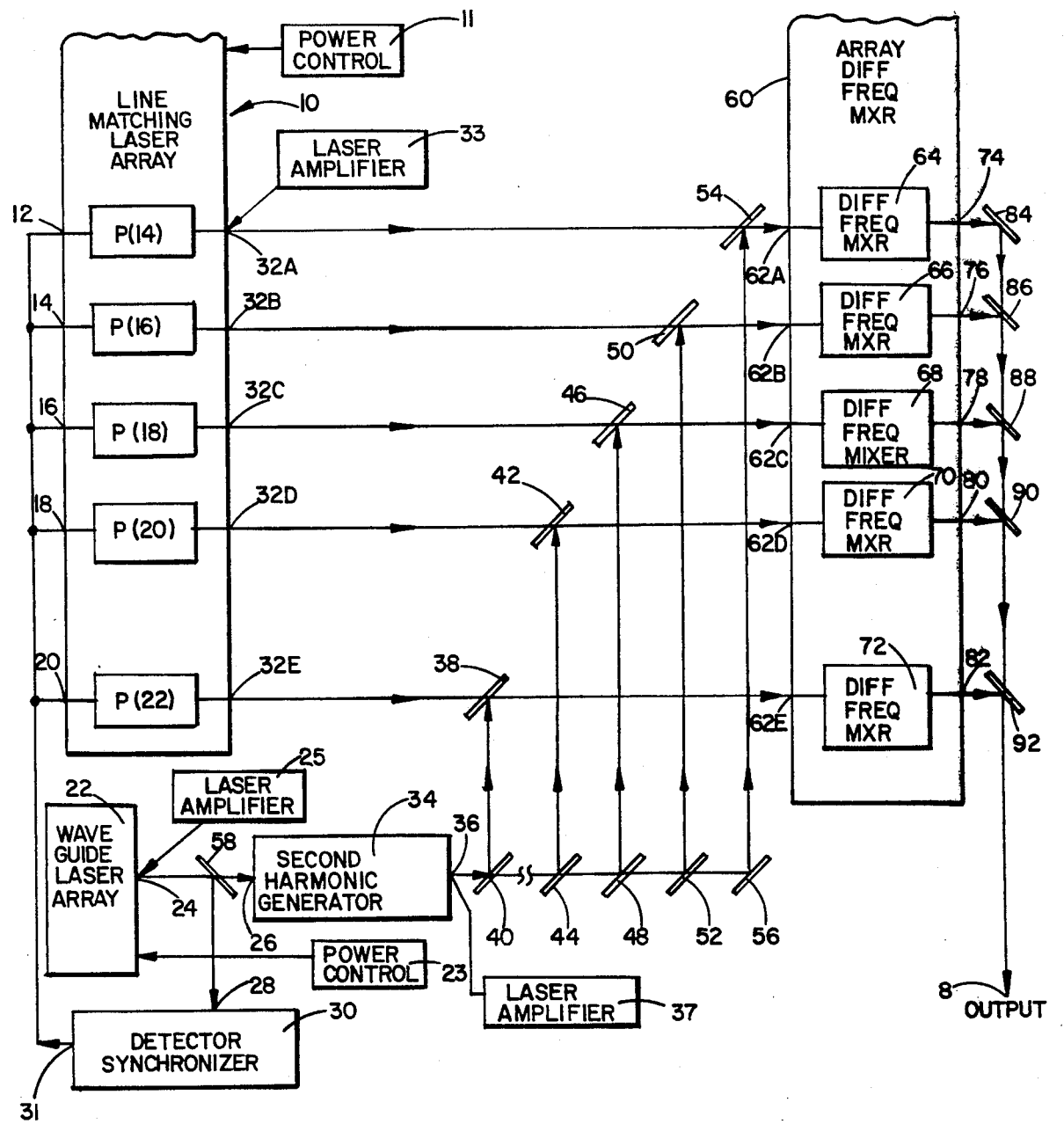
FIG. 2 is a more detailed schematic of a laser pulse apparatus.
Figure 3:
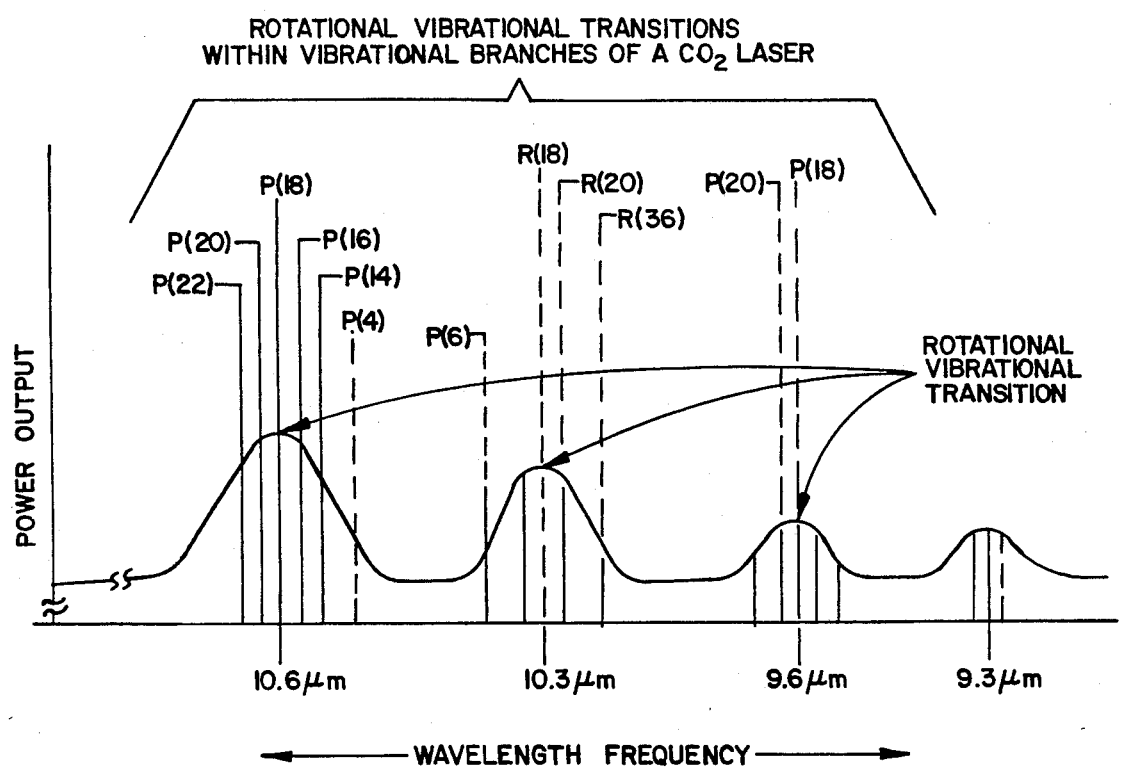
FIG. 3 is a graphical depiction of the power spectrum of a $CO_2$ laser.

FIG. 2 is a schematic illustration of a particular embodiment of an apparatus for generating a high-energy temporally shaped, coherent series of laser pulses having signal components on pre-selected rotational vibrational transitions. The apparatus is shown having a second-harmonic generator 34, a waveguide laser array 22 having a desired temporally shaped pulse output 24 optically coupled to the second-harmonic generator 34, a line matching laser array 10 of lasers operating on separate pre-selected rotational vibrational transitions, a detector synchronizer 30 having its input 28 optically coupled to the output 24 of the waveguide laser array 22 and being responsive to the pulse output of the waveguide laser array 22 in line matching laser synchronous pulse generating relation, and having its output electrically connected to the synchronizing inputs 12-20 of the line matching laser array 10. FIG. 2 also illustrates a corresponding series of difference frequency mixers having inputs 62A-62E receiving the output 36 of the second-harmonic generator 34 and respectively the outputs 32A-32E of the line matching lasers P(14)-P(22) to form a high-energy, coherent series of laser pulses having a waveguide laser array output-determined temporal shape and line matching laser array output-determined rotational vibrational transitions.

FIG. 2 also illustrates the well known use of beam splitting optics to achieve the required optical coupling. Beam splitter 58 is shown interposed between waveguide laser array output 24 and second-harmonic generator input 26 to optically link the input 28 of the detector synchronizer with the output of the waveguide laser array 22. Beam splitters 38-56 are shown providing the required optical coupling between the output 36 of the second-harmonic generator and the outputs 32A-32E of the line matching laser array 10 and the inputs 62A-62E of the difference frequency mixer array 60. Beam splitters 84-92 are shown providing the required optical coupling between the outputs 74-82 of the difference frequency mixers 64-72 and the output 8 of the apparatus.

Figure 4:
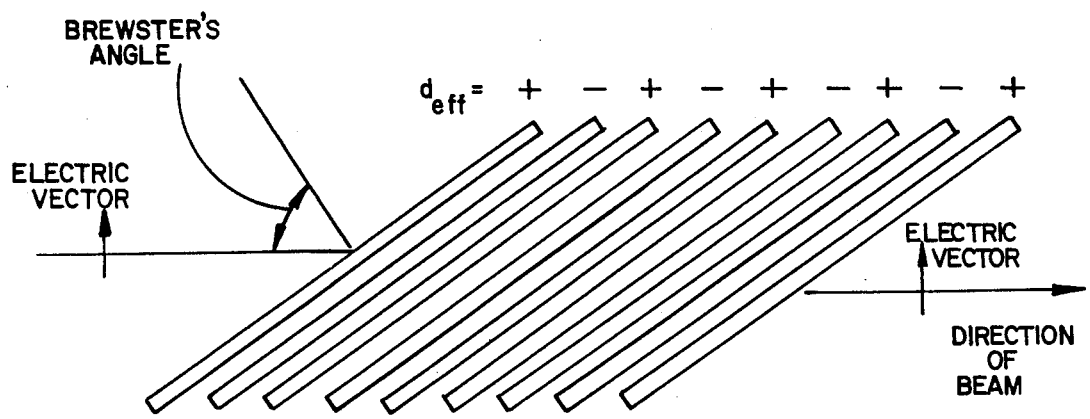
FIG. 4 is a schematic diagram of a stack of GaAs plates useful in the invention.

In FIGS. 1 and 2, the second-harmonic generator 34 comprises stacked crystal plates, shown in detail in FIG. 4, and having transparency, thickness, separation, and angle of incidence characteristics providing doubling of the frequency of the output 24 of the waveguide laser array 22.

FIG. 4 is also schematically illustrative of the stacked crystal plates comprising the difference frequency mixers 64-72 and the difference frequency mixer array 60. The difference frequency mixers stacked crystal plates are selected having transparency, thickness, separation and angle of incidence characteristics for mixing the synchronously received outputs 32A-32E of the line matching laser array 10 and the output 36 of the second-harmonic generator 34 and being responsive to the sensed frequency differences therebetween. The stack of crystal plates used in the second-harmonic generator 34 or in the difference frequency mixers 64-72 are typically made of GaAs. The plates are typically coherence-length-thick and are used to generate the second-harmonic of a $CO_2$ laser or to generate the difference frequencies between a second-harmonic at 5.3 μm and other $CO_2$ laser lines. Referring to FIG. 4, the alternating sign of the nonlinear coefficient deff is used to phase match the interaction among different plates.

Returning to FIGS. 1 and 2 the lasers comprising the waveguide laser array 22 and the lasers comprising the line matching laser array 10 are typically $CO_2$ lasers but can be other types. The lasers comprising the waveguide laser array 22 are provided with power control means 11 to vary the power separately to each of the lasers of the line matching laser array. In the embodiment shown in FIG. 2 the line matching laser array 10 is comprised of 5 lasers, P(14)–P(22). The P(18) laser operates on a rotational vibrational transition corresponding to the rotational vibrational transition of lasers comprising the waveguide laser array 22. The lasers comprising the line matching laser array 10 and those comprising the waveguide laser array 22 are laser oscillators having outputs that may be amplified by laser amplifiers. In a preferred embodiment: a laser amplifier 37 is placed at the output 36 of the second-harmonic generator 34 to amplify the output of the second-harmonic generator to the inputs 62A–62E of the difference frequency mixers 64–72; a laser amplifier 25 is placed at output 24 of the waveguide laser array 22 to amplify the output of the waveguide laser array to the second-harmonic generator input 26; laser amplifiers 33 (only one being shown for convenience of illustration) are placed at the outputs 32A–32E of the line matching laser array 10 to amplify the outputs of the line matching laser array to the inputs 62A–62E of the difference frequency mixers 64–72.

OPERATION AND CONSTRUCTION

The invention has as an objective the production of temporally shaped output pulses having a dynamic range, RdB, in excess of 70 dB. For the purpose of discussion, the output pulses of the apparatus will be assumed to have a Lorentzian shape. Referring to FIG. 2, the shape of these output pulses and their repetition rate will be controlled by the waveguide laser array 22, having at its output 24 a temporally shaped coherent series of laser pulses on one preselected rotational vibrational transition. The temporal shape of the output pulses from the waveguide laser array 22 is controlled by controlling the output power of each of the laser oscillators comprising the waveguide laser array. To achieve the desired output pulse dynamic range of $RdB=70$ dB, the waveguide laser array 22 has seven or more lasers operating on the P(18) rotational vibrational transition and separated in frequency by 100 MHz. The reference laser typically operates at a center P(18) reference wavelength of 10.5710 μm or $2.8379430 \times 10^{13}$ Hz. The respective laser oscillators in the waveguide laser array 22 typically operate at the frequencies shown in Table 1.

TABLE 1

| Laser Oscillator | Wavelength μm | Wavenumber $cm^{-1}$ | Frequency × $10^{-}$ HZ |
|---|---|---|---|
| A1 | 10.571148 | 945.9709 | 2.8379130 |
| B1 | 10.571111 | 945.9743 | 2.8379230 |
| C1 | 10.571074 | 945.9776 | 2.8379330 |
| D1 | 10.571036 | 945.9810 | 2.8379430 |
| E1 | 10.570999 | 945.9843 | 2.8379530 |
| F1 | 10.570962 | 945.9876 | 2.8379630 |

TABLE 1-continued

| Laser Oscillator | Wavelength μm | Wavenumber $cm^{-1}$ | Frequency × $10^{-}$ HZ |
|---|---|---|---|
| G1 | 10.570925 | 945.9909 | 2.8379730 |

These laser oscillators are each phase locked to the reference laser oscillator referred to as D1 in Table 1. The operation of the waveguide laser array is disclosed in U.S. Pat. No. 4,163,954 to Cecil Hayes, Aug. 7, 1979, the disclosure of which is hereby incorporated by reference.

The output of the waveguide laser array 22 is optically coupled to the input 26 of the second-harmonic generator 34 which is adapted to double the frequency of the pulse output of the waveguide laser array.

The second-harmonic generator 34, and the difference frequency mixers 64–72 shown in FIG. 1 are nonlinear devices described in a first reference by J. D. McMullen, Journal of Applied Physics 46, 3076 (1975) and in a second reference by D. E. Thompson, J. D. McMullen and D. B. Anderson, Applied Physics Letter 29, 113 (1976).

Both devices use stacks of thin GaAs plates in their construction and have an efficiency of conversion that is related to the number of stacked plates employed.

As reported in the above second reference, a stack of 30 GaAs crystal plates may be expected to yield a conversion efficiency of about 20% when operated with pump intensities greater than 20 $MW/cm^2$. Besides offering wideband phase matching, the stacked plate devices offer potentially higher average power capability than can be obtained with birefringent single crystals. The thin GaAs plates are efficiently cooled by flowing chilled dry nitrogen gas over the surfaces. This approach has been experimentally validated and it offers considerable advantage in efficiency and high-power capability over alternative nonlinear, infrared materials.

The difference frequency mixers 64–72 shown in FIG. 2 achieve the required combination of the two input beams by nonlinear parametric interaction. The efficiency of this interaction is dependent on the ability of the respective difference frequency mixers to phase match the two waves. The phase matching must be broadband, or at least tunable over a wide range of frequency mixing conditions. The material which best fulfills these requirements at wavelengths between 10.6 μm and 5.3 μm is GaAs, which has one of the largest nonlinear susceptibilities of any transparent infrared material, along with very low absorption.

The method chosen to phase match the parametric interactions is referred to as the "stacked plate" method as discussed in the first referenced paper by J. D. McMullen, J. Appl. Phys. 46, 3076 (1975), as illustrated in FIG. 4. This Figure shows a number of GaAs plates, each one coherence length thick, which are oriented in series at Brewster's angle of incidence to two incident beams. After traveling the distance of one coherence length, the two input waves and the nonlinear polarization wave at the second harmonic frequency or the difference frequency are out of phase by $\pi$. The GaAs crystals are oriented so the sign of the effective nonlinear coefficient is reversed in each consecutive crystal. This is equivalent to introducing a phase shift of $\pi$ in the nonlinear polarization, so the three waves are back in synchronism and the parametric exchange of energy into the new frequency mode can continue to build up constructively.

The outputs 74-82 of the respective difference frequency mixers 64-72 consist of a coherent wave having a frequency that is the difference between the frequencies of the two respective inputs to the respective difference frequency mixer. Outputs 74-82 of the respective difference frequency mixers 64-72 are then optically combined using beam splitting lenses 84-92 to form a single high-energy, temporally shaped, coherent series of laser pulses having single components on the respective separate pre-selected rotational vibrational transitions.

The result of doubling the frequency of the output 24 of the waveguide laser array 22 by the use of a second-harmonic generator 34, and subtracting the frequency of the respective outputs 32A-32E of the line matching laser array 10 from output 36 of the second-harmonic generator 34 in the difference frequency mixers 64-72, achieves the desired nonlinear mixing result.

The pulsed output is synthesized by the waveguide laser array (P) on P(18) at 945.981 cm$^{-1}$ (within ±0.6 GHz). This pulse is frequency doubled to 1891.962 cm$^{-1}$ (P') and mixed with the output A on P(14) at 949.480, giving a difference frequency centered at 942.482 cm$^{-1}$, only 0.0979 cm$^{-1}$ (2.937 GHz) from line center on the P(22) line at 942.384 cm$^{-1}$. Similarly, the output of B on P(16) is mixed with P' to produce P(20) at 944.219 cm$^{-1}$, 0.024 cm$^{-1}$ (0.735 GHz) from line center on P(20). The difference frequencies for this mixing scheme are thus close enough to line center to be within the bandwidth of a multi-atmospheric amplifier, which is ~2 GHz/atm halfwidth or ~5 GHz bendwidth at 2.5 atm. Table 2 shows the frequencies produced by this beam combining scheme.

TABLE 2

Square and Difference Frequency Mising Scheme

| Output | | Frequency (cm$^{-1}$) | Wavenumber (cm$^{-1}$) | Offset (cm$^{-1}$) | Offset (GHz) |
|---|---|---|---|---|---|
| WGL | P(18) | 945.9810 | 1891.9620 | | |
| A | P(14) | 949.4800 | 942.482 | 0.0970-P(22) | 2.937 |
| B | P(16) | 947.7427 | 944.2193 | 0.0245-P(20) | 0.735 |
| C | P(18) | 945.9810 | 945.9810 | 0.0000-P(18) | 0.000 |
| D | P(20) | 944.1948 | 947.7672 | 0.0245-P(16) | 0.735 |
| E | P(22) | 942.3841 | 949.5779 | 0.0797-P(14) | 2.937 |

There is thus provided pulse forming apparatus producing a series of temporally shaped coherent laser pulses having signal components on pre-selected rotational vibrational transitions that is easily modified to compensate for distortion and in which the number of lasers required to produce the required pulse power gain is minimized. The above described embodiments of this apparatus are merely descriptive of the principles of the invention and are not to be considered limiting. The scope of this invention instead shall be determined from the scope of the following claims including their equivalents

What is claimed is:

1. Apparatus for generating a high-energy temporally shaped, coherent series of laser pulses having signal components on pre-selected rotational vibrational transitions, comprising:
   a waveguide laser array having an output comprising a desired temporally shaped coherent series of laser pulses on one pre-selected rotational vibrational transition,
   a second-harmonic generator arranged to double the waveguide laser array output frequency,
   a line matching laser array having a plurality of outputs of another temporal shape on additional rotational vibrational transitions, and
   means comprising an array of difference frequency mixers responsive to synchronized reception of line matching laser array outputs and said frequency doubled waveguide laser array output to form a corresponding high-energy, coherent series of laser pulses having a waveguide laser array output-determined temporal shape and line matching laser array output-determined rotational vibrational transitions.

2. The apparatus of claim 1, in which said second-harmonic generator comprises stacked crystal plates having transparency, thickness, separation and angle of incidence characteristics providing doubling of the frequency of the output of said waveguide laser array.

3. The apparatus of claim 2, in which said crystal plates comrise GaAs.

4. The apparatus of claim 1, in which said difference frequency mixers comprise stacked crystal plates having transparency, thicknes, separation and angle of incidence characteristics mixing said synchronously received outputs responsive to sensed frequency differences therebetween.

5. The apparatus of claim 4, in which the crystal plates comprise GaAs.

6. The apparatus of claim 1, in which each of said lasers is a $CO_2$ laser.

7. The apparatus of claim 1, including also means to vary the power separately to each laser of the waveguide laser array.

8. The apparatus of claim 1, including also means to vary the power separately to each laser of the line matching laser array.

9. The apparatus of claim 1, in which a line matching laser operates on a rotational vibrational transition corresponding to the rotational vibrational transition of the waveguide laser array.

10. The apparatus according to claim 9, in which other line matching lasers operate at spaced wavelengths.

11. The apparatus of claim 1, including also a laser amplifier amplifying the output of the second-harmonic generator to the difference frequency mixers.

12. The apparatus of claim 1, including also a laser amplifier amplifying the waveguide laser array output to the second-harmonic generator.

13. The apparatus of claim 1, including also a laser amplifier amplifying the line matching laser output to the difference frequency mixers.

14. Apparatus for generating a high-energy temporally shaped, coherent series of laser pulses having signal components on pre-selected rotational vibrational transitions, said apparatus having few lasers relative to the dynamic range realized, and said apparatus comprising a second-harmonic generator, a waveguide laser array having a desired temporally shaped pulse output to said second-harmonic generator, a line matching laser array of lasers operating on separate pre-selected rotational vibrational transitions, a detector synchronizer responsive to the pulse output of said waveguide laser array in line matching laser synchronous pulse generating relation, a corresponding series of difference frequency mixers receiving the output of the second-harmonic generator and respectively the outputs of the line matching lasers to form a high-energy, coherent series of laser pulses having a waveguide laser array output-determined temporal shape and line matching laser array output-determined rotational vibrational transitions.

15. The apparatus of claim 14, in which said second-harmonic generator comprises stacked crystal plates having transparency, thickness, separation and angle of incidence characteristics providing doubling of the frequency of the output of said waveguide laser array.

16. The apparatus of claim 15, in which said crystal plates comprise GaAs.

17. The apparatus of claim 15, in which said difference frequency mixers comprise stacked crystal plates having transparency, thickness, separation and angle of incidence characteristics mixing said synchronously received outputs responsive to sensed frequency differences therebetween.

18. The apparatus of claim 17, in which the crystal plates comprise GaAs.

19. The apparatus of claim 17, in which each of said lasers is a $CO_2$ laser.

20. The apparatus of claim 19, including also means to vary the power separately to each laser of the waveguide laser array.

21. The apparatus of claim 20, including also means to vary the power separately to each laser of the line matching laser array.

22. The apparatus of claim 21, in which a line matching laser operates on a rotational vibrational transition corresponding to the rotational vibrational transition of the waveguide laser array.

23. The apparatus according to claim 22, in which other line matching lasers operate at spaced wavelengths.

24. The apparatus of claim 23, including also a laser amplifier amplifying the output of the second-harmonic generator to the difference frequency mixers.

25. The apparatus of claim 24, including also a laser amplifier amplifying the waveguide laser array output to the second-harmonic generator.

26. The apparatus of claim 25, including also a laser amplifier amplifying the line matching laser output to the difference frequency mixers.

* * * * *

UNITED STATES PATENT AND TRADEMARK OFFICE
CERTIFICATE OF CORRECTION

PATENT NO. : 4,330,721

DATED : May 18, 1982

INVENTOR(S) : James P. Hauck et al

It is certified that error appears in the above-identified patent and that said Letters Patent are hereby corrected as shown below:

Column 1, line 42, change (00.1) to read -- 00˙1 --; line 43, change (10.0) to read -- 10˙0 --.

Column 2, line 60, change (operation) to read -- operating --.

Column 5, line 63, change ($10^-$) to read -- $10^{13}$ --.

Column 6, line 3, change ($10^-$) to read -- $10^{13}$ --.

Column 7, line 38, change (Mising) to read -- Mixing --.

Signed and Sealed this

Twenty-seventh Day of July 1982

[SEAL]

Attest:

Attesting Officer

GERALD J. MOSSINGHOFF

Commissioner of Patents and Trademarks